US012638914B2

(12) United States Patent
Hashimoto et al.

(10) Patent No.: US 12,638,914 B2
(45) Date of Patent: *May 26, 2026

(54) VIRTUAL OBJECT DISPLAY DEVICE AND VIRTUAL OBJECT DISPLAY METHOD

(71) Applicant: MAXELL, LTD., Kyoto (JP)

(72) Inventors: Yasunobu Hashimoto, Kyoto (JP);
Naohisa Takamizawa, Kyoto (JP);
Hiroshi Shimizu, Kyoto (JP)

(73) Assignee: Maxell, Ltd., Kyoto (JP)

( * ) Notice: Subject to any disclaimer, the term of this
patent is extended or adjusted under 35
U.S.C. 154(b) by 0 days.

This patent is subject to a terminal dis-
claimer.

(21) Appl. No.: 19/059,964

(22) Filed: Feb. 21, 2025

(65) Prior Publication Data

US 2025/0190047 A1 Jun. 12, 2025

Related U.S. Application Data

(63) Continuation of application No. 18/601,716, filed on
Mar. 11, 2024, now Pat. No. 12,260,014, which is a
(Continued)

(51) Int. Cl.
*G06F 3/01* (2006.01)
*G01C 19/00* (2013.01)
(Continued)

(52) U.S. Cl.
CPC .............. *G06F 3/011* (2013.01); *G01C 19/00*
(2013.01); *G01P 13/00* (2013.01); *G01P 15/18*
(2013.01);
(Continued)

(58) Field of Classification Search
CPC ........ G06F 3/011; G06F 3/012; G06F 3/0481;
G06T 7/70; G06T 11/00;
(Continued)

(56) References Cited

U.S. PATENT DOCUMENTS

2015/0138081 A1   5/2015   Iwatsu et al.
2016/0189426 A1   6/2016   Thomas et al.
(Continued)

FOREIGN PATENT DOCUMENTS

JP         2006-252468 A      9/2006
JP         2013-61870 A       4/2013
(Continued)

OTHER PUBLICATIONS

Notice of Reasons for Refusal issued for the corresponding Japa-
nese patent application No. 2023-043872 on Feb. 6, 2024, w/
English Translation.

(Continued)

*Primary Examiner* — Muhammad N Edun
(74) *Attorney, Agent, or Firm* — Rimon P.C.

(57) ABSTRACT

A virtual object display device comprises a display and a
display control device configured to perform display control
of the display. The display control device includes: a coor-
dinate system calculation unit configured to detect move-
ment and rotation of the virtual object display device in a
real world, and use an inertial coordinate system in which a
coordinate origin thereof follows the movement of the
virtual object display device and an effective field of view of
the display is rotated therein in accordance with the rotation
of the virtual object display device so as to define an
arrangement position of an inertial coordinate system virtual
object; and a display control unit configured to, when the
inertial coordinate system virtual object is included in the
effective field of view of the display, display the inertial
coordinate system virtual object within the effective field of
view.

20 Claims, 11 Drawing Sheets

Related U.S. Application Data continuation of application No. 17/425,254, filed as application No. PCT/JP2019/003611 on Feb. 1, 2019, now Pat. No. 11,960,635.

(51) Int. Cl.

| | |
|---|---|
| *G01P 13/00* | (2006.01) |
| *G01P 15/18* | (2013.01) |
| *G06T 7/70* | (2017.01) |
| *G06T 11/00* | (2026.01) |
| *G06V 40/10* | (2022.01) |

(52) U.S. Cl.
CPC ................ *G06T 7/70* (2017.01); *G06T 11/00* (2013.01); *G06V 40/103* (2022.01); *G06T 2207/30196* (2013.01)

(58) Field of Classification Search
CPC ........... G06T 2207/30196; G06T 11/60; G06T 19/00; G06V 20/20; G06V 40/103; G06V 10/94; H04N 5/64; G01P 13/00; G01P 15/18; G01C 19/00
See application file for complete search history.

(56) References Cited

U.S. PATENT DOCUMENTS

| | | |
|---|---|---|
| 2016/0196692 A1 | 7/2016 | Kjallstrom et al. |
| 2016/0210784 A1 | 7/2016 | Ramsby et al. |
| 2016/0239080 A1 | 8/2016 | Marcolina et al. |
| 2017/0069134 A1 | 3/2017 | Shapira et al. |
| 2017/0083084 A1 | 3/2017 | Tatsuta et al. |
| 2017/0213388 A1 | 7/2017 | Margolis et al. |
| 2018/0003979 A1 | 1/2018 | Nakashima et al. |
| 2022/0180562 A1 | 6/2022 | Eastman et al. |

FOREIGN PATENT DOCUMENTS

| | | |
|---|---|---|
| JP | 2017-224003 A | 12/2017 |
| JP | 2018-505472 A | 2/2018 |
| WO | 2014/129105 A1 | 8/2014 |
| WO | 2016/002318 A1 | 1/2016 |

OTHER PUBLICATIONS

Notice of Allowance received in parent U.S. Appl. No. 17/425,254, dated Dec. 18, 2023.
Non-Final Rejection received in parent U.S. Appl. No. 17/425,254, dated Sep. 7, 2023.
International Search Report issued in corresponding International Patent Application No. PCT/JP2019/003611, dated Apr. 9, 2019, with English translation.
Notice of Allowance received in parent U.S. Appl. No. 18/601,716, dated Dec. 10, 2024.
Non-Final Rejection received in parent U.S. Appl. No. 18/601,716, dated Sep. 19, 2024.

ROTATION OF
USER'S HEAD

ROTATION OF INERTIAL
COORDINATE SYSTEM

MOVEMENT OF USER

FIG. 11

| TYPE OF VIRTUAL OBJECT | EXAMPLE OF ICON | DISPLAY STATE |
|---|---|---|
| WORLD COORDINATE SYSTEM REAL OBJECT | OBJECT IN OUTSIDE FIELD (CAN BE VIEWED IN SEE-THROUGH STATE) | NORMAL DISPLAY |
| WORLD COORDINATE SYSTEM VIRTUAL OBJECT | VIRTUAL OBJECT FIXED TO OUTSIDE FIELD | NORMAL DISPLAY |
| LOCAL COORDINATE SYSTEM VIRTUAL OBJECT | OPERATION MENU, APPLICATION ICON, AND APPLICATION SCREEN OF DEVICE WITH HIGH IMPORTANCE | NORMAL DISPLAY |
| INERTIAL COORDINATE SYSTEM 1 VIRTUAL OBJECT | OPERATION MENU, APPLICATION ICON, APPLICATION SCREEN, AND OMNIDIRECTIONAL IMAGE OF DEVICE WITH LOW IMPORTANCE | NORMAL DISPLAY |
| INERTIAL COORDINATE SYSTEM 2 VIRTUAL OBJECT | ICON GROUP FOR RIGHT-HANDED | EXCLUSIVE DISPLAY |
| INERTIAL COORDINATE SYSTEM 3 VIRTUAL OBJECT | ICON GROUP FOR LEFT-HANDED | |

VIRTUAL OBJECT DISPLAY DEVICE AND VIRTUAL OBJECT DISPLAY METHOD

CROSS REFERENCE TO RELATED APPLICATIONS

This application is a continuation of U.S. patent application Ser. No. 18/601,716, filed Mar. 11, 2024, which is a continuation of U.S. patent application Ser. No. 17/425,254, filed Jul. 22, 2021, now U.S. Pat. No. 11,960,635 issued on Apr. 16, 2024, which is the U.S. National Phase under 35 U.S.C § 371 of International Application No. PCT/JP2019/003611, filed Feb. 1, 2019, the entire contents of each are hereby incorporated by reference.

TECHNICAL FIELD

The present invention relates to a virtual object display device and a virtual object display method.

BACKGROUND ART

Conventionally, there has been a technique of displaying a virtual object on a head mounted display (HMD). As coordinate systems used in the virtual object display technique, a world coordinate system and a local coordinate system have been known.

The world coordinate system is a coordinate system for the real world. A user cannot view a virtual object arranged in the world coordinate system once leaving the place. On the other hand, since the world coordinate is as wide as the real world, many virtual objects can be arranged thereon.

The local coordinate system is a coordinate system fixed to the HMD, and thus the positional relationship between the local coordinate system and a display mounted on the HMD is also fixed. The display of the HMD displays a virtual object arranged in a direction in which a display surface of the display exists as seen from the user's point of view. When the virtual object is arranged on the local coordinate system within a direction range in which the display surface of the display exists, even if the user wearing the HMD moves, the display keeps displaying the virtual object and allows the user to perform an operation since the display is fixed to the local coordinate system. On the other hand, since the display only displays a virtual object arranged in the direction range described above, the number of virtual objects to be arranged thereon is limited.

In the prior art provided with only two coordinate systems for virtual object arrangement, namely, the world coordinate system and the local coordinate system, there has been a problem that many virtual objects to which a user wants to frequently refer cannot be arranged thereon. In addition, there has been another problem that the visibility of the external field is reduced when the virtual objects are forcibly arranged in the direction in which the display surface of the display exists.

As a technique for solving the problems above, Patent Literature 1 proposes "a wearable, head-mounted display system includes a near-eye display to display an augmented reality object perceivable at an apparent real world depth and an apparent real world location by a wearer of the head-mounted display system, and a controller to adjust the apparent real world location of the augmented reality object as a function of a field of view (FOV) of the wearer. The function is based on a bounding region of the augmented reality object and one or more overlap parameters between the bounding region of the augmented reality object and the FOV of the wearer (excerpted from Abstract)".

According to Patent Literature 1, since a part of the virtual object arranged in the world coordinate system is left in the field of view of the wearer, the wear can easily access the virtual object arranged in the world coordinate system, thereby increasing the number of virtual objects to which the wearer can always refer.

CITATION LIST

Patent Literature

Patent Literature 1: JP-A-2018-505472

SUMMARY OF INVENTION

Technical Problem

However, in the technique disclosed in Patent Literature 1, when the user moves in the world coordinate system, the virtual object arranged in the world coordinate system becomes separated from the user, which makes it difficult to display the virtual object in the field of view of the wearer. On the other hand, when the virtual object is arranged in the field of view of the wearer in order to eliminate the inconvenience above, many virtual objects are placed in the field of view of the wearer, which cannot solve the problem that the visibility of the external field is reduced. In this way, Patent Literature 1 cannot provide the essential solution to the problems above.

The present invention has been made in view of the circumstances above, and an object thereof is to provide a new virtual object display technique for improving convenience for a user by complementing defects in a world coordinate system and a local coordinate system.

Solution to Problem

In order to solve the problems above, the present invention includes the technical features described in the scope of claims. As one aspect of the present invention, it is provided a virtual object display device, comprising: a display; and a display control device configured to perform display control of the display, the display control device including: a coordinate system calculation unit configured to detect a movement amount and a rotation amount of the virtual object display device in a real world, and use an inertial coordinate system in which a coordinate origin thereof follows movement of the virtual object display device and an effective field of view of the display is rotated therein in accordance with rotation of the virtual object display device so as to define an arrangement position of an inertial coordinate system virtual object; and a display control unit configured to, when the inertial coordinate system virtual object is included in the effective field of view of the display, display the inertial coordinate system virtual object within the effective field of view.

Advantageous Effects of Invention

According to the present invention, it is possible to provide a new virtual object display technique for improving convenience for a user by complementing defects in a world coordinate system and a local coordinate system. The problems, configurations, and effects other than those described above will be clarified by explanation of the embodiment below.

BRIEF DESCRIPTION OF DRAWINGS

FIG. 11 illustrates an example of a data structure storing virtual objects.

DESCRIPTION OF EMBODIMENTS

Figure 1:
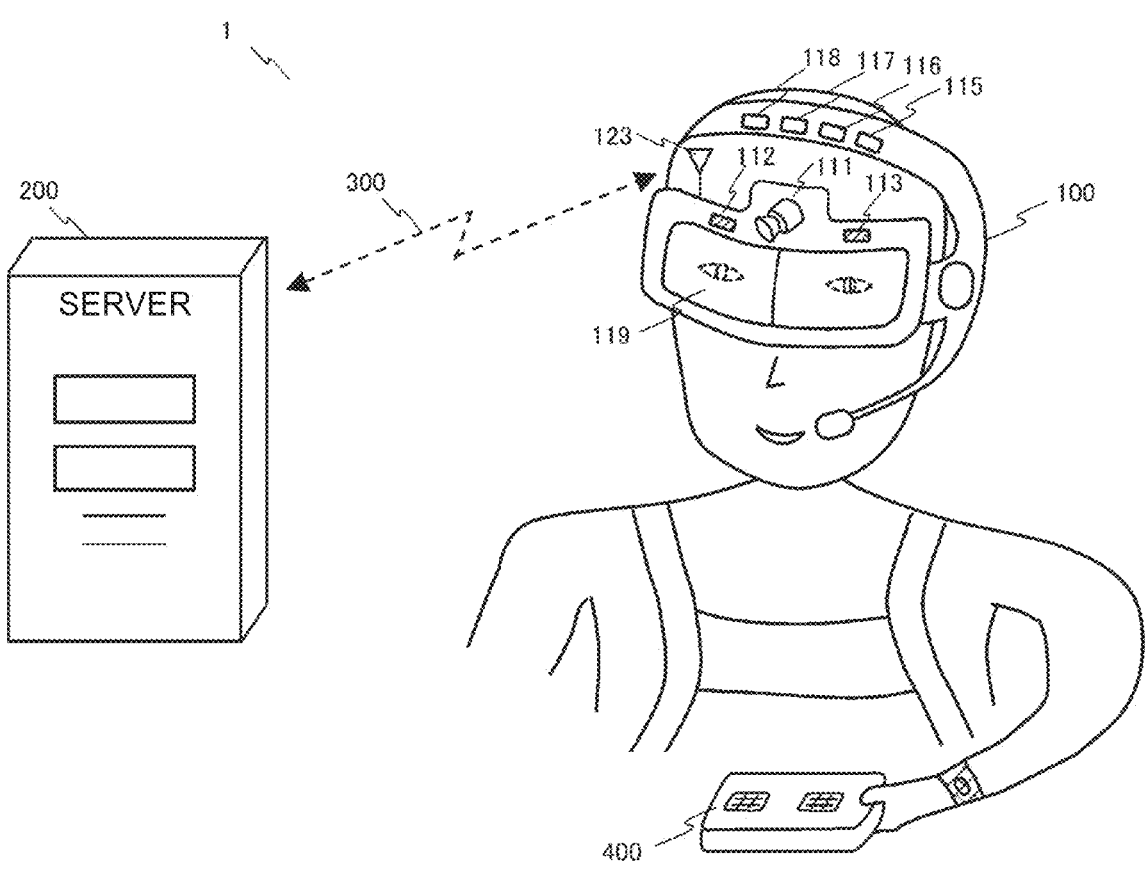
FIG. 1 is a schematic diagram illustrating an appearance of an HMD system according to the present embodiment.
Figure 2:
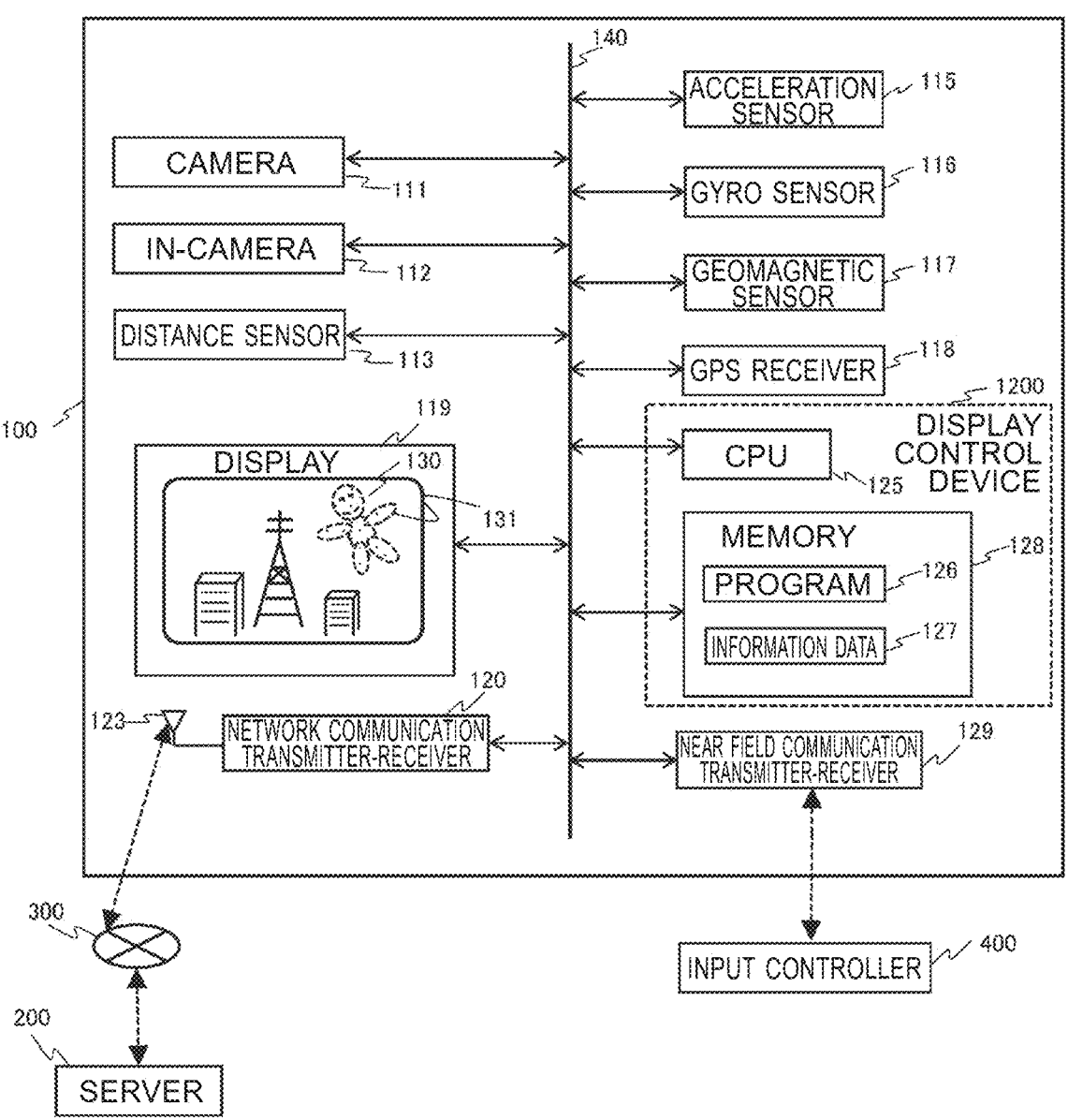
FIG. 2 is a hardware configuration diagram of an HMD.

Hereinafter, an embodiment of the present invention will be described with reference to the drawings. Throughout the drawings, the same elements and processes are provided with the same reference signs, and repetitive explanation therefor will be omitted. FIG. 1 is a schematic diagram illustrating an appearance of a Head Mounted Display (HMD) system 1 according to the present embodiment. FIG. 2 is a hardware configuration diagram of the HMD 100.

As illustrated in FIG. 1, the HMD system 1 includes an HMD 100 to be mounted on a user's head, and an input controller 400. The input controller 400 is connected to the HMD 100 through a near field communication transmitter-receiver to transmit and receive information therebetween. In this connection, wired communication may be carried out to transmit and receive information therebetween.

The input controller 400 is provided with an operation member including a keyboard and key buttons, and a near field communication transmitter-receiver.

A server 200 generates a virtual object and transmits the generated virtual object to the HMD 100 through an external network 300. It may be configured that the HMD 100 itself generates and displays the virtual object.

As illustrated in FIG. 2, the HMD 100 includes a camera 111, an in-camera 112, and a distance sensor 113. In addition, the HMD 100 includes an acceleration sensor 115 as an inertial sensor for measuring motion, and a gyro sensor 116 (the acceleration sensor 115 and the gyro sensor 116 correspond to a motion measurement sensor). Furthermore, the HMD 100 includes a geomagnetic sensor 117, a GPS receiver 118, a display 119, a network communication transmitter-receiver 120, a CPU 125, a memory 128, and a near field communication transmitter-receiver 129. The components above are connected to each other via a bus 140. The network communication transmitter-receiver 120 is connected to an antenna 123 that receives wireless communication waves.

The network communication transmitter-receiver 120 is a communication interface for establishing communication between the HMD 100 and the external server 200 by wireless LAN, wired LAN, or base station communication. During wireless communication, the network communication transmitter-receiver 120 is connected to the external network 300 via the antenna 123 to transmit and receive information. The network communication transmitter-receiver 120 receives the virtual object generated in the server 200 via the external network 300, in other words, can transmit and receive operation control signals to and from the server 200. The network communication transmitter-receiver 120 is configured by a communication device corresponding to a long-distance communication standard such as Wideband Code Division Multiple Access (W-CDMA) or Global System for Mobile communications (GSM, registered mark).

The near field communication transmitter-receiver 129 is a communication interface for carrying out near field communication between the input controller 400 and the HMD 100. The near field communication transmitter-receiver 129 uses, for example, an electronic tag, but is not limited thereto. As the near field communication transmitter-receiver 129, a communication device corresponding to Bluetooth (registered mark), Infrared Data Association (IrDA), Zigbee (registered mark), Home Radio Frequency (HomeRF, registered mark), or wireless LAN (IEEE802.11a, IEEE802.11b, IEEE802.11g) may be used.

The HMD 100 is connected to the input controller 400 via the near field communication transmitter-receiver 129. The HMD 100 receives operation information which has been accepted by the input controller 400 through the near field communication line. The CPU 125 loads a program 126 stored in the memory 128 and executes it. When executing the program 126, the CPU 125 reads information data 127 and uses the data as necessary. The CPU 125 causes the display 119 to display an image 130 and a virtual object 131 thereon. Therefore, the CPU 125, the memory 128, the program 126, and the information data 127 are collectively referred to as a display control device 1200.

The display 119 is provided in front of both eyes of the user who is wearing the HMD 100. The CPU 125 causes the display 119 to display thereon the image 130 of real space information captured by the camera 111, and the virtual object 131 received from the server 200.

The acceleration sensor 115 is a sensor configured to detect acceleration of the HMD 100, which is used to obtain the perpendicular direction based on change in the position of the HMD 100 and a gravitational acceleration direction of the HMD 100.

The gyro sensor 116 is a sensor configured to detect angular velocity of three-axis rotational direction of the HMD 100. The gyro sensor 116 is used to detect, based on the detected angular velocity, posture of the HMD 100, in other words, Euler angles (pitch angle, yaw angle, roll angle) representing the orientation of the local coordinate system with respect to the world coordinate system, or normalized quaternion. By using the acceleration sensor 115 and the gyro sensor 116 mounted on the HMD 100, it is possible to detect the movement of the head of the user wearing the HMD 100.

The geomagnetic sensor 117 is a sensor configured to detect magnetic force of the Earth, which is used to detect a direction to which the HMD 100 is directed. By using the three-axis type geomagnetic sensor 117 which detects not only the geomagnetism of the longitudinal direction and the lateral direction but also that of the vertical direction, it is possible to obtain geomagnetic change to the movement of the head, thereby making it possible to detect the movement of the head. With these sensors, the variation in the user's head movement can be detected in detail while he or she is wearing the HMD 100.

The CPU 125 serves as a controller of the HMD 100 and executes the program 126 such as an OS (Operating System) and an application software for operation control stored in the memory 128.

The memory 128 is, for example, a flash memory, and stores the various kinds of the program 126 used by the CPU 125. In addition, the memory 128 stores the virtual object received from the server 200 as the information data 127.

Figure 3:
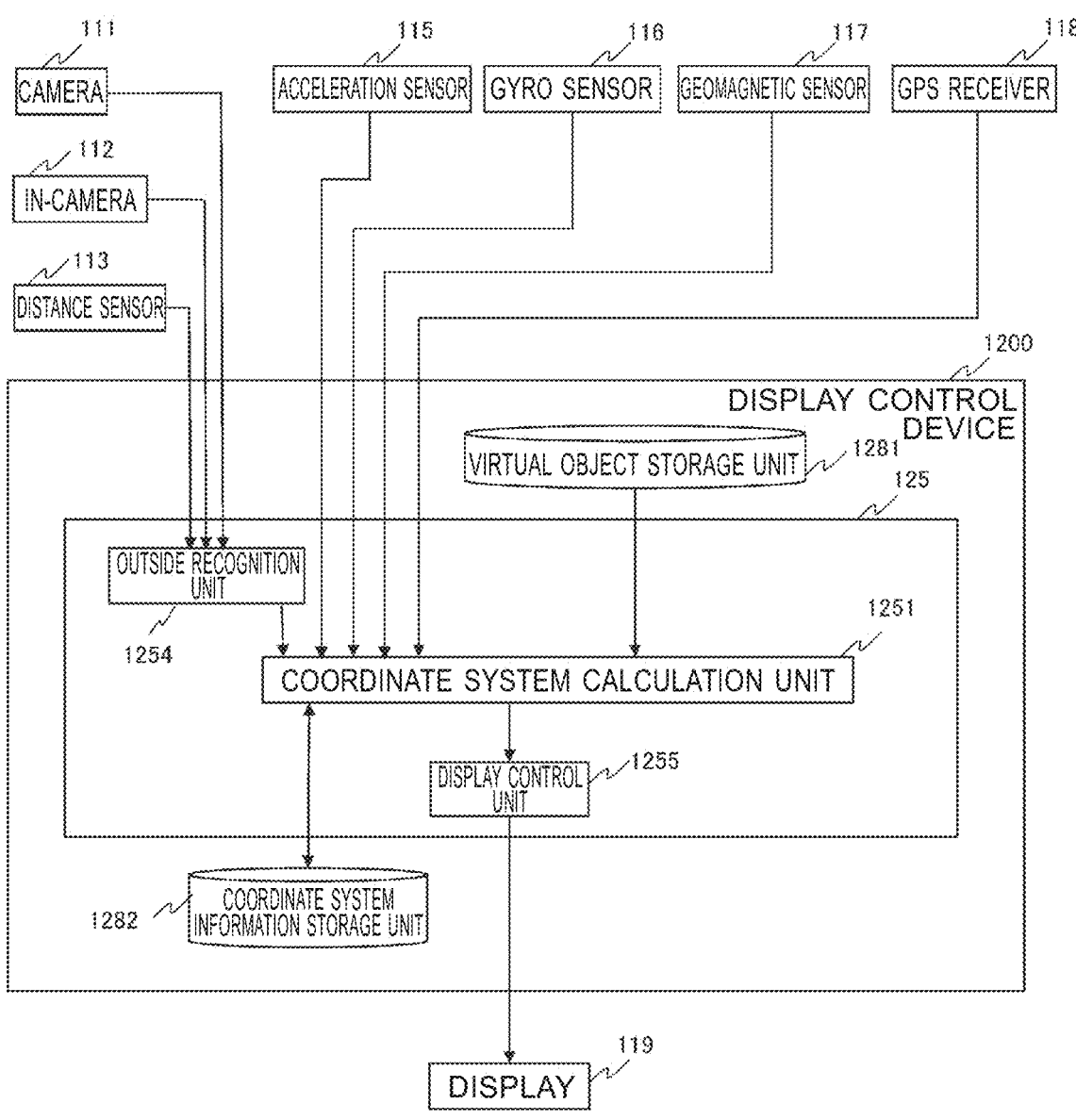
FIG. 3 is a functional block diagram of functions of a CPU.

FIG. 3 is a functional block diagram of the functions of the CPU 125. The CPU 125 includes a coordinate system calculation unit 1251, an outside recognition unit 1254, and a display control unit 1255. The memory 128 is partially provided with a virtual object storage unit 1281 configured to store a virtual object, and a coordinate system information storage unit 1282 configured to store information of the position and orientation of the coordinate system and the front direction of the inertial coordinate system. Details of the processing executed by each component will be described later.

Here, the front direction of the inertial coordinate system means a reference direction of the inertial coordinate system which remains in the front direction of an average user even when the user temporarily changes the direction of his or her head. When the virtual object that the user wants to frequently check or operate is arranged around an arrangement center direction set in the inertial coordinate system and the arrangement center direction is set in the front direction of the inertial coordinate system, the user can check or operate the frequently used virtual object without rotating his or her head so much.

Furthermore, in the case where the virtual objects that the user wants to frequently check or operate are divided into groups depending on the purpose of use, the arrangement center direction may be set to correspond to each group. For example, an icon group of application software related to the work A may be arranged near the X-axis positive direction of the inertial coordinate system while an icon group of application software related to the work B may be arranged near the Y-axis positive direction. Furthermore, since working target objects are often located immediately near the arrangement center direction, the virtual object may be arranged by avoiding a position immediately near the arrangement center direction.

In the present invention, it is important to detect and control the orientation of each coordinate system. Using the world coordinate system as a reference, the orientation of each coordinate system is expressed by the rotation operation at the time of rotating the world coordinate system so as to be matched with the orientation of each coordinate system with respect to the world coordinate system. Specifically, the rotation operation is expressed by Euler angles (roll angle, pitch angle, yaw angle) or a normalized quaternion.

The coordinate systems used to arrange the virtual object on the HMD 100 are a conventional world coordinate system, a conventional local coordinate system, and an inertial coordinate system as a new coordinate system for complementing the defects in each of the world coordinate system and the local coordinate system. Hereinafter, the features of each coordinate system will be described with reference to FIG. 4 to FIG. 8. FIG. 4 explains the local coordinate system. FIG. 5 explains the inertial coordinate system. FIG. 6 explains a case where the inertial coordinate system moves within the world coordinate system.

The world coordinate system is a coordinate system having three coordinate axis directions that constitute a three-axis orthogonal coordinate system fixed to the real world, with one point thereof being fixed to the real world as a coordinate origin. Accordingly, even when the HMD 100 changes its space position in the real world, the arrangement position of the virtual object defined by the world coordinate system does not change. In the present embodiment, the world coordinate system is set based on the posture and a position of the HMD 100 at the time of initialization of the HMD 100. After the initialization, change in the position and the posture of the HMD 100 in the real world is detected mainly from the measured values of the acceleration sensor 115 and the gyro sensor 116 to calculate the position and the orientation of the local coordinate system with respect to the set world coordinate system. In the case where GPS signals can be received, latitude, longitude, and altitude information calculated from the GPS positioning radio waves received by the GPS receiver 118 may be supplementally used for the calculation of the positions of the local coordinate system and world coordinate system. Furthermore, the direction of the geomagnetism measured by the geomagnetic sensor 117 may be supplementally used for the calculation of the orientations of the coordinate systems.

Hereinafter, an example of a method of setting the world coordinate system will be described. Since the local coordinate system that is also a three-axis orthogonal coordinate system is used for setting the world coordinate system, in the following, the local coordinate system will be defined in detail, firstly. The origin of the local coordinate system is set to be located near the center of the head which is deeper than the eyeball of the user wearing the HMD 100. The origin of the local coordinate system is set near the position that the user feels is his or her own viewpoint position, thereby only requiring rotation of the local coordinate system when the user rotates his or her head but not requiring special processing for eliminating a sense of discomfort. Then, each coordinate axis of the local coordinate system is defined such that the front direction of the user wearing the HMD 100 is the positive direction of the X-axis, the left-hand direction is the positive direction of the Y-axis, and the upper direction is the positive direction of the Z-axis. Meanwhile, the definition of the local coordinate system is not limited to the example above as long as the origin is located near the center of the HMD 100.

The world coordinate system is set at the time of initialization of the HMD 100. Firstly, the HMD 100 is initialized while being in a stationary state. At the time of initialization of the HMD 100, the origin of the world coordinate system is made to be matched with the origin of the local coordinate system. When the HMD 100 is in the stationary state, the acceleration to be detected by the three-axis acceleration sensor is only the gravitational acceleration, from which the perpendicular direction in the local coordinate system can be obtained. Then, the vertically upward direction is defined as the positive direction of the Z-axis of the world coordinate system, and the direction in which the positive direction of the X-axis of the local coordinate system is projected onto the horizontal plane is defined as the positive direction of the X-axis of the world coordinate system. The positive direction of the Y-axis of the world coordinate system is the direction that is the left-hand direction when the positive direction of the X-axis is defined as the front.

In this way, the world coordinate system has been set. On the other hand, since there is no guarantee that the HMD 100 is held horizontally at the time of its initialization, the orientation of the local coordinate system does not necessarily match with the world coordinate system. However, the world coordinate system is set based on the local coordinate system, and thus the orientation of the local coordinate system based on the world coordinate system has been obtained. The orientation of the local coordinate system in its initial state is expressed as a result of the rotation operation from the world coordinate system in the world coordinate system. In the following, the rotation operation is expressed by a normalized quaternion $q_{LW0}$ although it also can be expressed by Euler angles. The normalized quaternion $q_{LW0}$ is an expression in the world coordinate system.

The normalized quaternion is a quaternion of which a norm is 1, and able to represent rotation about a certain axis. A normalized quaternion q representing rotation of an angle $\eta$ when a unit vector $(n_X, n_Y, n_Z)$ serves as the rotation axis is as follows.

$$q = \cos(\eta/2) + n_X \sin(\eta/2)i + n_Y \sin(\eta/2)j + n_Z \sin(\eta/2)k \quad (1)$$

In the equation above, each of i, j, k is a unit of a quaternion. The clockwise rotation with respect to the vector $(n_X, n_Y, n_Z)$ indicates a rotation direction in which $\eta$ is positive. Since the rotation of an arbitrary coordinate system is expressed by the normalized quaternion above, the orientation of the local coordinate system and that of the inertial coordinate system are expressed by the normalized quaternions representing the rotation from the world coordinate system. The normalized quaternion representing the orientation of the world coordinate system is 1.

Here, the usage of the symbols is summarized as below. A real number of the normalized quaternion q is represented as Sc(q), and q* is a conjugate quaternion of the normalized quaternion q. An operator that normalizes the norm of the quaternion to 1 is defined by "[ ]". When q is an arbitrary quaternion, the following equation defines "[ ]".

$$[q] = q / (qq^*)^{1/2} \quad (2)$$

A denominator on the right side of the equation (2) is a norm of the normalized quaternion q. Next, a quaternion expressing a coordinate point or vector p $(p_X, p_Y, p_Z)$ is defined by the following equation.

$$p = p_X i + p_Y j + p_Z k \quad (3)$$

A projection operator of a vector onto a plane orthogonal to a unit vector n is expressed as P(n). The projection of the vector p is expressed by the following equation.

$$P(n)p = p + nSc(np) \quad (4)$$

In the present specification, unless otherwise noted, symbols representing coordinate points and vectors that are not indication of components are assumed to be quaternions.

If a coordinate point or direction vector $p_1$ is converted to a coordinate point or direction vector $p_2$ by a rotation operation about the origin which is represented as q, $p_2$ is calculated by the following equation.

$$p_2 = qp_1 q^* \quad (5)$$

Since the normalized quaternion representing the orientation of the coordinate system is obtained as above, it is possible to convert position coordinates of a virtual object between the coordinate systems. A conversion equation of a coordinate point when the coordinate origins differ with each other will be described later. Here, an equation of a normalized quaternion R $(n_1, n_2)$ for rotation about an axis perpendicular to a plane including $n_1$ and $n_2$ so as to overlap the unit vector $n_1$ on the unit vector $n_2$ is described below since it will be used in the later explanation.

$$R(n_1, n_2) = [1 - n_2 n_1] \quad (6)$$

The orientation $q_{LW0}$ of the local coordinate system at the time of initialization is expressed by the normalized quaternion above. Firstly, at the time of initialization, a gravitational acceleration vector $(g_X, g_Y, g_Z)$ is obtained in the local coordinate system, and the quaternion is expressed as $g_L$. Then, a quaternion of a projection vector $(0, g_Y, g_Z)$ of the gravitational acceleration vector, which is projected onto the YZ-plane of the local coordinate system, is defined as $h_L$, and expressed by the following equation using a projection operator.

$$h_L = P(i)g_L \quad (7)$$

The rotation from the local coordinate system to the world coordinate system will be considered by employing a procedure of rotating the X-axis of the local coordinate system in the direction of projection onto the horizontal plane of the world coordinate system in the initial state so as to superimpose it on the horizontal plane, and thereafter, superimposing the Z-axis of the local coordinate system on the Z-axis of the world coordinate system by the rotation about the X-axis of the local coordinate system. When noted that the rotation for superimposing the X-axis of the local coordinate system on the horizontal plane of the world coordinate system is equal to the rotation for superimposing $h_L$ on $g_L$, and also noted that $q_{LW0}$ is defined as the rotation from the world coordinate system to the local coordinate system, $q_{LW0}$ is obtained by the following equation.

$$q_{LW0} = q_1^* q_2^* \quad (8)$$

In the equation above, $q_1$ and $q_2$ are defined by the following equation.

$$q_1 = R([h_L], [g_L]) \tag{9}$$

$$q_2 = R(q_1 k q_1^*, -q_1[h_L] q_1^*) \tag{10}$$

The world coordinate system is defined in the equations above, meanwhile, the present invention is not limited to the example above as long as the coordinate system is the one on which the position of the external field can be described.

Furthermore, the world coordinate system is set at the initialization in the above, meanwhile, there are cases requiring the world coordinate system that was previously set. In this case, the positional relationship between the world coordinate system set at the time of initialization and the previously set world coordinate system is obtained based on the coordinate values of feature points of the external field, and the latitude, longitude, and altitude information calculated from the GPS positioning radio waves received by the GPS receiver 118 so as to change the coordinate origins and the orientation of the local coordinate system and the inertial coordinate system based on the previously set world coordinate system.

At the time of initialization, the origin of the inertial coordinate system is set to be the same as that of the local coordinate system, and the orientation of the inertial coordinate system is set to be the same as that of the world coordinate system. The origin and the orientation of the inertial coordinate system are controlled by the method which will be described later.

Next, a method of calculating the change, which occurs due to the motion of the HMD 100, in the normalized quaternion $q_{LW}$ representing the orientation of the local coordinate system will be described. When an angular velocity vector detected by the gyro sensor 116 is ($\omega_X$, $\omega_Y$, $\omega_Z$), a quaternion of this angular velocity vector $\omega_L$ is expressed by the following equation.

$$\omega_L = \omega_X i + \omega_Y j + \omega_Z k \tag{11}$$

It should be noted that, in the equation above, the angular velocity vector $\omega_L$ is an expression of the local coordinate system. An angular velocity vector ow in the world coordinate system is given by the following equation.

$$\omega_W = q_{LW} \omega_L q_{LW}^* \tag{12}$$

Furthermore, when noted that $q_{LW}$ is an expression of the world coordinate system, a difference equation for determining time development of $q_{LW}$ is as follows.

$$\Delta q_{Lw} / \Delta t = (1/2) \omega_W q_{LW} = (1/2) q_{LW} \omega_L \tag{13}$$

By applying a measurement interval of the gyro sensor 116 to $\Delta t$, $q_{LW}$ is sequentially updated by the equation (13). At the time of calculation by the equation (13), a technique for increasing approximation accuracy may be used therewith, or correction may be added to keep a norm of $q_{LW}$ at 1. Furthermore, in order to correct accumulation of errors, the measurement result in the geomagnetic direction by the geomagnetic sensor 117 may be used, or the position information of feature points of the external field detected by the camera 111 and the distance sensor 113 may be used.

The acceleration values measured by the acceleration sensor 115 are used to update a position of the origin of the local coordinate system in the world coordinate system. When an acceleration vector detected by the acceleration sensor 115 is ($a_X$, $a_Y$, $a_Z$), a quaternion of the acceleration vector $a_L$ is expressed by the following equation.

$$a_L = a_X i + a_Y j + a_Z k \tag{14}$$

It should be noted that, in the equation above, the acceleration vector $a_L$ is an expression of the local coordinate system. An acceleration vector aw in the world coordinate system is given by the following equation.

$$a_W = q_{LW} a_L q_{LW}^* \tag{15}$$

It is assumed that position coordinates of the origin of the local coordinate system in the world coordinate system is $O_{LW}$, a velocity vector of the origin of the local coordinate system is $v_W$, and a gravitational acceleration vector is $g_W$. The gravitational acceleration vector $g_W$ was measured at the time of initialization of the HMD 100. A difference equation for determining temporal development of the velocity vector $v_W$ is as follows.

$$\Delta v_W / \Delta t = a_W - g_W \tag{16}$$

A difference equation for determining temporal development of the position coordinates $O_{LW}$ is as follows.

$$\Delta O_{LW} / \Delta t = v_W \tag{17}$$

By applying a measurement interval of the acceleration sensor 115 to $\Delta t$, $v_W$ and $\omega_{LW}$ are sequentially updated by the equations (16) and (17). At the time of calculation by the equations (16) and (17), a technique for increasing approximation accuracy may be used therewith. Furthermore, latitude, longitude, and altitude information calculated from the GPS positioning radio waves received by the GPS receiver 118 may be used to update the position of the origin of the local coordinate system in the world coordinate system, or position information of feature points of the external field detected by the camera 111 and the distance sensor 113 may be used. Here, in order to simplify the processing, the measurement interval of the acceleration sensor 115 may be made equal to the measurement interval of the gyro sensor 116.

The procedure described above for updating the local coordinate system may be applicable even if the definition of the initial state of the world coordinate system is changed, as long as the world coordinate system is fixed to the external field.

Since the display 119 for displaying the virtual object is fixed to the local coordinate system, position information relating to the virtual objects arranged in the world coordinate system and the inertial coordinate system is converted for display control so as to be expressed in the local coordinate system. When a coordinate value or vector in the world coordinate system is $p_W$, $p_{WL}$ which is an expression of $p_W$ in the local coordinate system is calculated by the following equation.

$$p_{WL} = q_{LW}^*(p_W - O_{LW})q_{LW} \qquad (18)$$

Next, it is assumed that position coordinates of the origin of the inertial coordinate system in the world coordinate system are defined as $O_{IW}$. The origin of the inertial coordinate system is usually matched with the origin of the local coordinate system, meanwhile, it may be different therefrom. When the orientation of the inertial coordinate system is $q_{IW}$ and a coordinate value or vector in the inertial coordinate system is $p_I$, $p_{IL}$ which is an expression of $p_I$ in the local coordinate system is calculated by the following equation.

$$p_{IL} = q_{LW}^*(q_{IW}p_Iq_{IW}^* + O_{IW} - O_{LW})q_{LW} \qquad (19)$$

Based on the conversion equation described above, conversion of the display position and orientation of the virtual object between the coordinate systems can be calculated.

Hereinafter, how the virtual objects look different depending on the movement of the HMD 100 and an operation of the coordinate system will be described. The local coordinate system is a coordinate system having three coordinate axis directions constituting the three-axis orthogonal coordinate system fixed to the HMD 100 with one point thereof being fixed to the HMD 100 as the coordinate origin when viewed from the HMD 100. In accordance with change in the orientation of the head of the user wearing the HMD 100, the local coordinate system is also rotated by the same angle as that of the change.

Figure 4A:
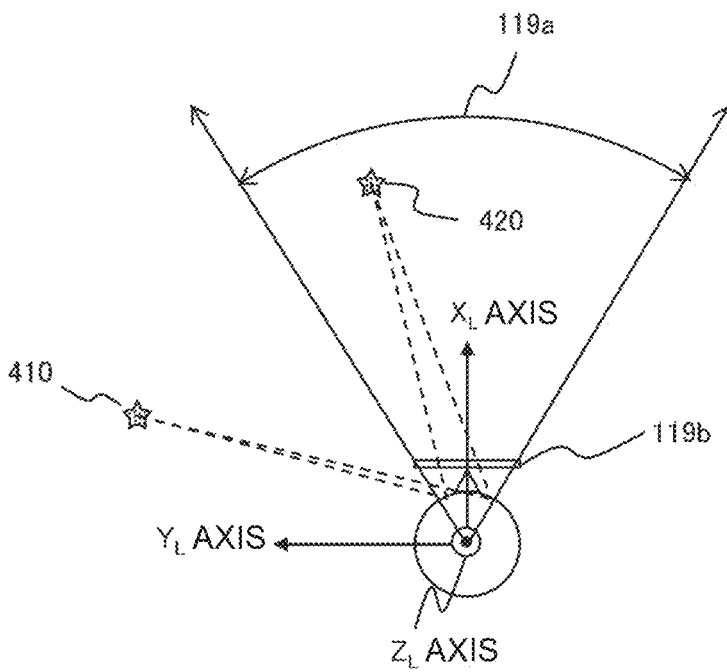
FIG. 4A explains a local coordinate system.

The display 119 is also fixed to the HMD 100 and displays a virtual object when the user's line of sight toward the virtual object enters a display range (display surface 119b) of the display 119. Within the coordinate system, a range which makes the virtual object visible is defined as an effective field of view (FOV) 119a. Within the local coordinate system, the FOV 119a is a region of the direction range that looks toward the display surface 119b of the display as viewed from the user's viewpoint. As illustrated in FIG. 4A, a local coordinate system virtual object 420 is within the FOV 119a and thus is displayed on the display 119 while a local coordinate system virtual object 410 is not within the FOV 119a and thus is not displayed on the display 119.

Hereinafter, an example of appearances of virtual objects when the user rotates his or her head and the local coordinate system is rotated accordingly will be described.

Figure 4B:
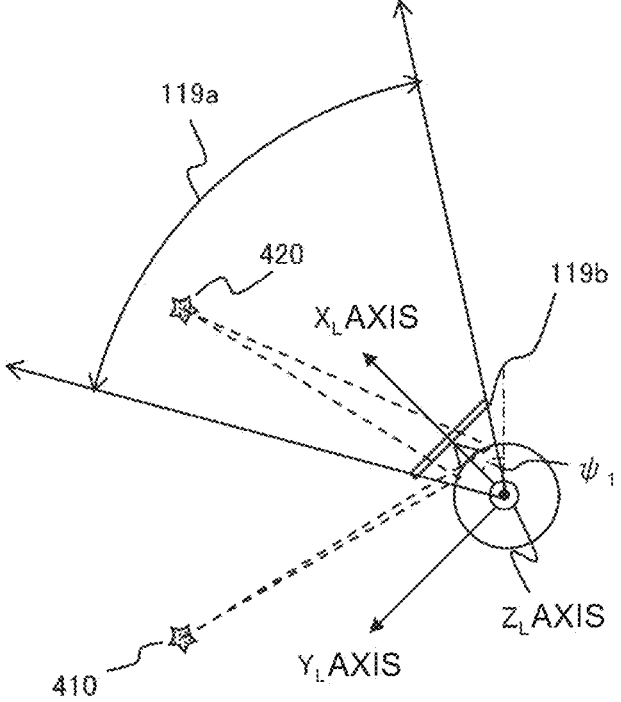
FIG. 4B explains a local coordinate system.

FIG. 4A and FIG. 4B illustrate an example of the appearances of the virtual objects arranged in the local coordinate system. When the user's head is rotated by the yaw angle $\psi_1$ from a state illustrated in FIG. 4A, the two axes ($X_L$-axis and $Y_L$-axis) of the local coordinate system are also rotated by the same angle as the yaw angle $\psi_1$ about the $Z_L$-axis as illustrated in FIG. 4B. In accordance with the rotation of the local coordinate system, the FOV 119a, the local coordinate system virtual object 410, and the local coordinate system virtual object 420 which are fixed to the local coordinate system are also rotated. As a result, the user can continue to view the local coordinate system virtual object 420 on the same display position, however, cannot view the local coordinate system virtual object 410 no matter how much the user moves his or her head. In the above, the rotation only by the yaw angle has been described for convenience of explanation. Meanwhile, in the case where the HMD 100 is rotated by the roll angle $\varphi$ and the pitch angle $\theta$, the $X_L$-axis, the $Y_L$-axis, and the $Z_L$-axis are also rotated by the same angle as the roll angle $\varphi$ and the pitch angle $\theta$.

The inertial coordinate system is a coordinate system in which the coordinate origin follows the movement of the HMD 100 (or the user) in the real space while the orientation of the coordinate does not follow the rotation of the HMD 100 in the real space. When viewed based on the inertial coordinate system, the FOV 119a is rotated in accordance with the rotation of the HMD 100. The virtual object is arranged in this inertial coordinate system and the virtual object follows the movement of the user, and accordingly, when rotating his or her head, the user can visually recognize all directions of the inertial coordinate system. As a result, it is possible to hold many virtual objects near the user in a state where they can be visually recognized even when the user moves. Here, the meaning of "the coordinate origin follows the HMD 100" is that the coordinate origin always stays within a certain distance from the HMD 100. In order to simplify the control, the coordinate origin may be set on the same position as that of the local coordinate system, that is, on the center of the HMD 100. Furthermore, when the user rotates his or her head in order to visually recognize various directions of the inertial coordinate system, the orientation of the inertial coordinate system may be fixed with respect to the real world, in other words, the world coordinate system in order to make the virtual object appear naturally while the user is rotating his or her head.

Figure 5A:
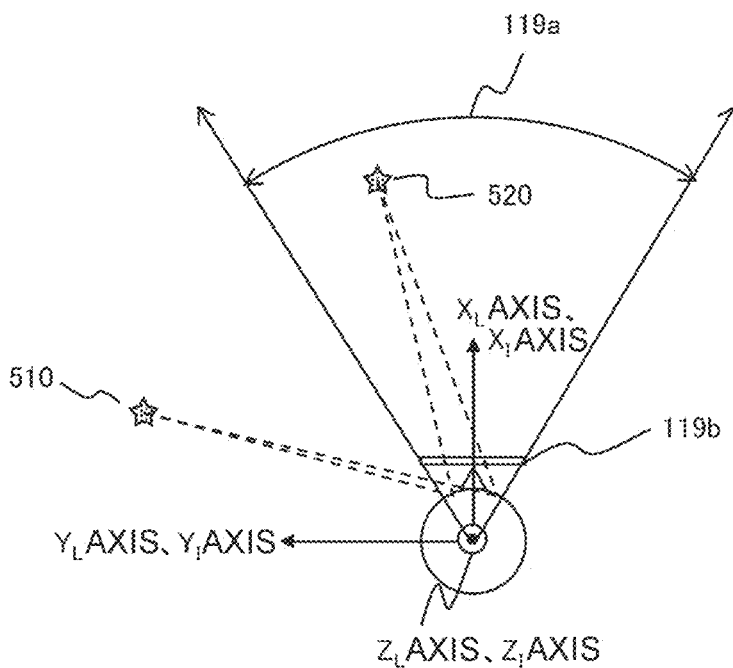
FIG. 5A explains an inertial coordinate system.
Figure 5B:
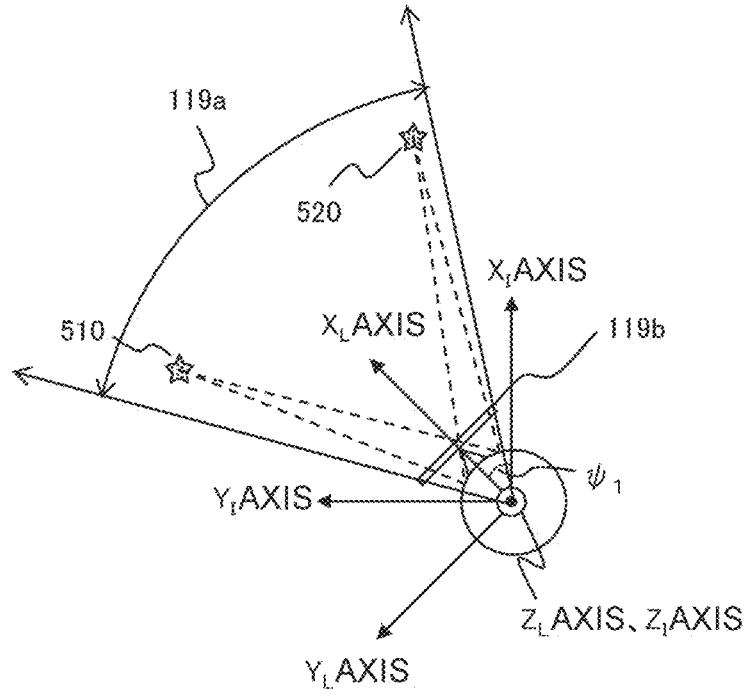
FIG. 5B explains an inertial coordinate system.
Figure 6:
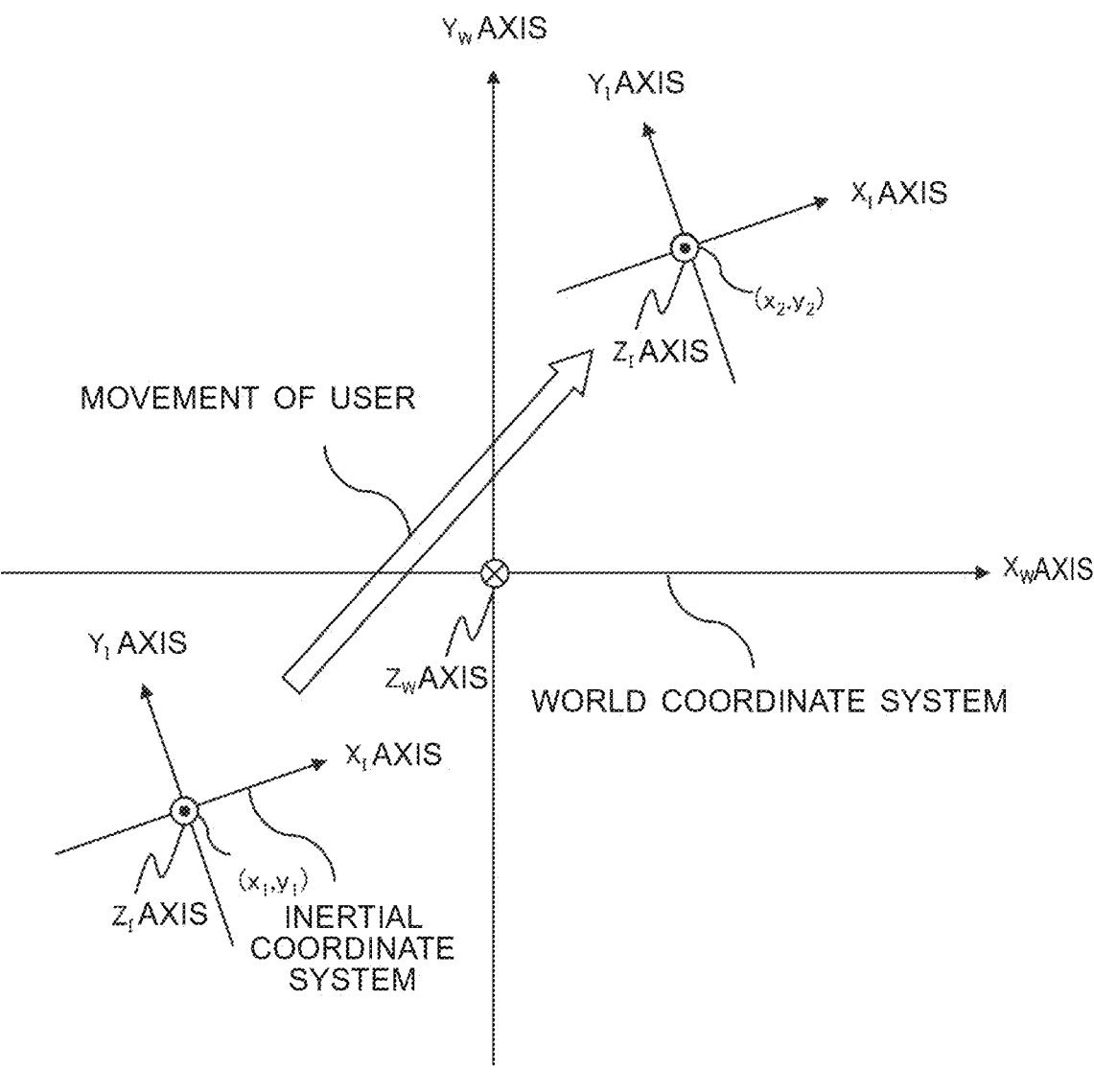
FIG. 6 explains a case where an inertial coordinate system moves within a world coordinate system.

FIG. 5A and FIG. 5B illustrate an inertial coordinate system in which the coordinate origin is fixed to the center of the HMD 100 in the same manner as the local coordinate system, and the orientation of the coordinate is fixed with respect to the world coordinate system. It is assumed that, in an initial state, an inertial coordinate system virtual object 510 in FIG. 5A is arranged outside the FOV 119a and an inertial coordinate system virtual object 520 is arranged inside the FOV 119a. When the user's head is rotated by the yaw angle $\psi_1$ from the initial state, as illustrated in FIG. 5B, the two axes ($X_L$-axis and $Y_L$-axis) of the local coordinate system are also rotated by the same angle as the yaw angle $\psi_1$ about the $Z_L$-axis. In accordance with the rotation of the local coordinate system above, the FOV 119a fixed to the local coordinate system is rotated to the FOV 119a illustrated in FIG. 5B.

On the other hand, since the orientation of the inertial coordinate system is selected to be fixed with respect to the world coordinate system, even when the user's head is rotated by the yaw angle $\psi_1$ from the initial state, the inertial coordinate system virtual objects 510, 520 do not change their positions based on the world coordinate system. As a result, the inertial coordinate system virtual object 510 is also included in the FOV 119a after the rotation, that is, the user can visually recognize the inertial coordinate system virtual object 510. In the above, the rotation only by the yaw angle has been described for convenience of explanation. Meanwhile, in the case where the HMD 100 is rotated by the roll angle $\varphi$ and the pitch angle $\theta$, the $X_L$-axis, the $Y_L$-axis, and the $Z_L$-axis are also rotated by the same angle as the roll angle $\varphi$ and the pitch angle $\theta$.

In the above, the orientation of the inertial coordinate system is fixed with respect to the world coordinate system. Meanwhile, the orientation of the inertial coordinate system may be changed by a changing operation. Furthermore, the origin of the inertial coordinate system also moves in the world coordinate system in accordance with the movement of the user. As illustrated in FIG. 6, it is assumed that the user wearing the HMD 100 is at $(x_1, y_1)$ in the world coordinate system and the coordinate origin of the inertial coordinate system in this case is $(x_1, y_1)$. When the user moves from $(x_1, y_1)$ to $(x_2, y_2)$, the coordinate origin of the inertial coordinate system moves in parallel by the same movement amount as the amount of the user's movement above, and changes its position from $(x_1, y_1)$ to $(x_2, y_2)$. On the other hand, since the coordinate axis direction is relatively fixed with respect to the world coordinate system, the direction of the $X_I$-$Y_I$ axis of the inertial coordinate system of which the coordinate origin is at $(x_1, y_1)$ is the same as the direction of the $X_I$-$Y_I$ axis of the inertial coordinate system of which the coordinate origin is at $(x_2, y_2)$.

Figure 7:
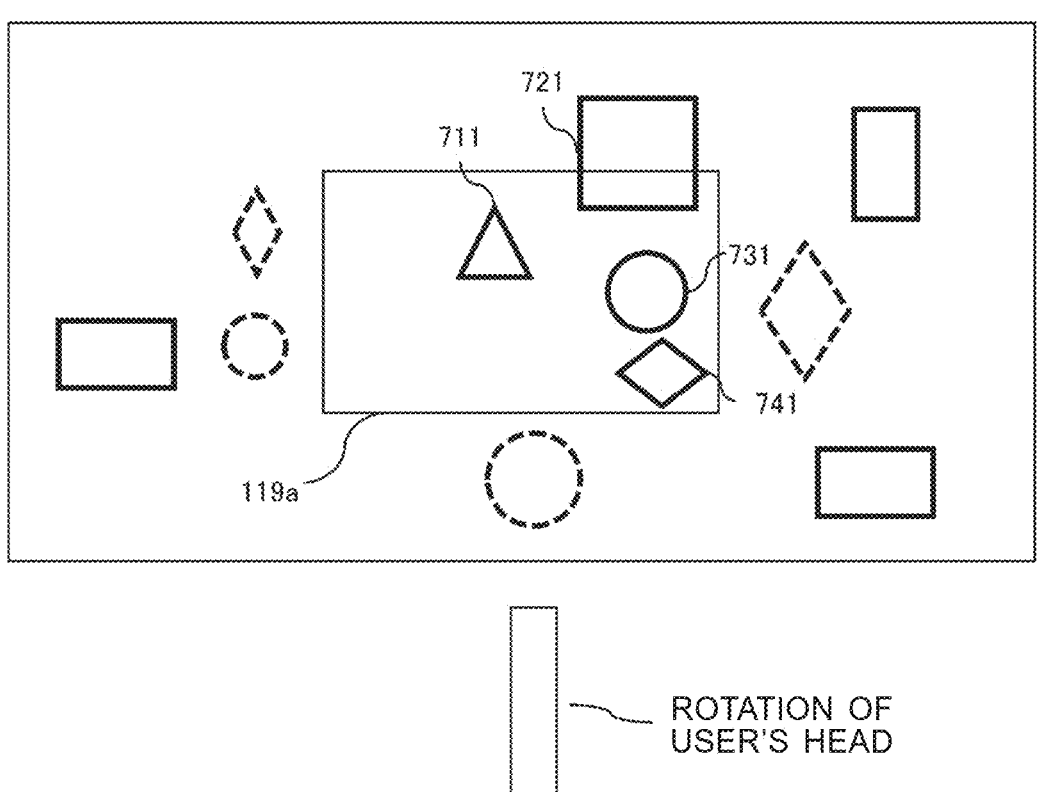
FIG. 7 explains appearances of real objects and virtual objects.
Figure 7:
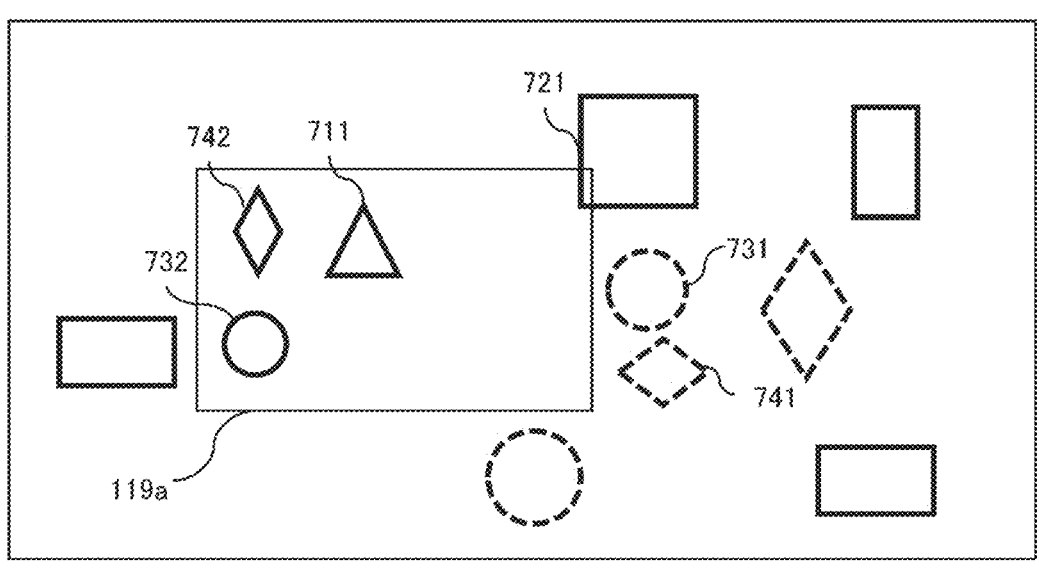
Figure 8:
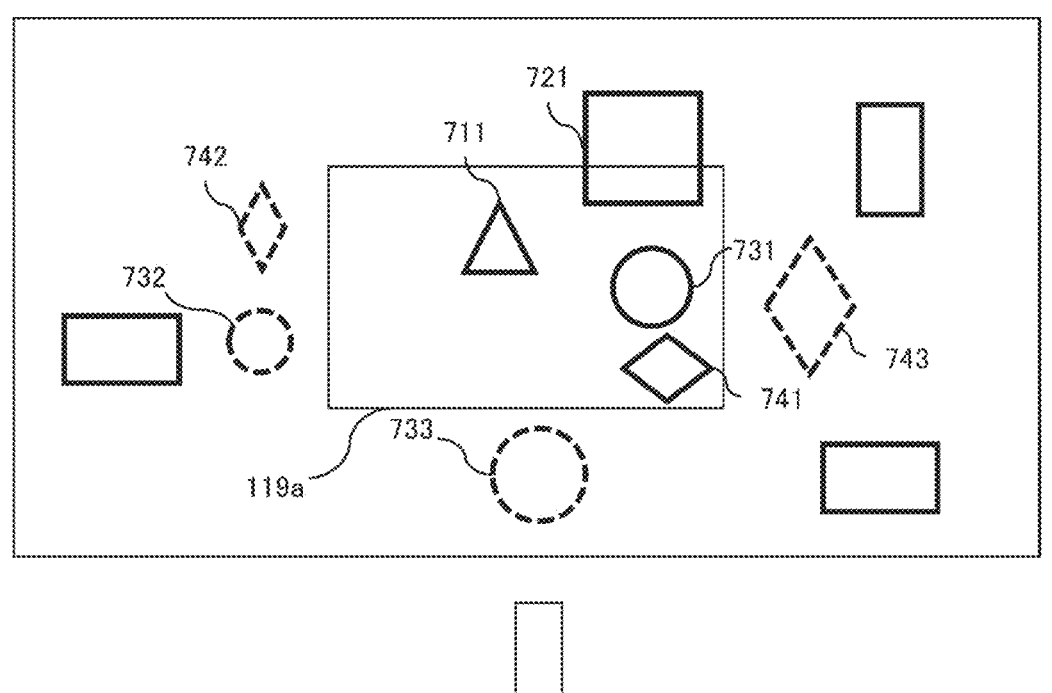
FIG. 8 explains appearances of real objects and virtual objects.
Figure 8:
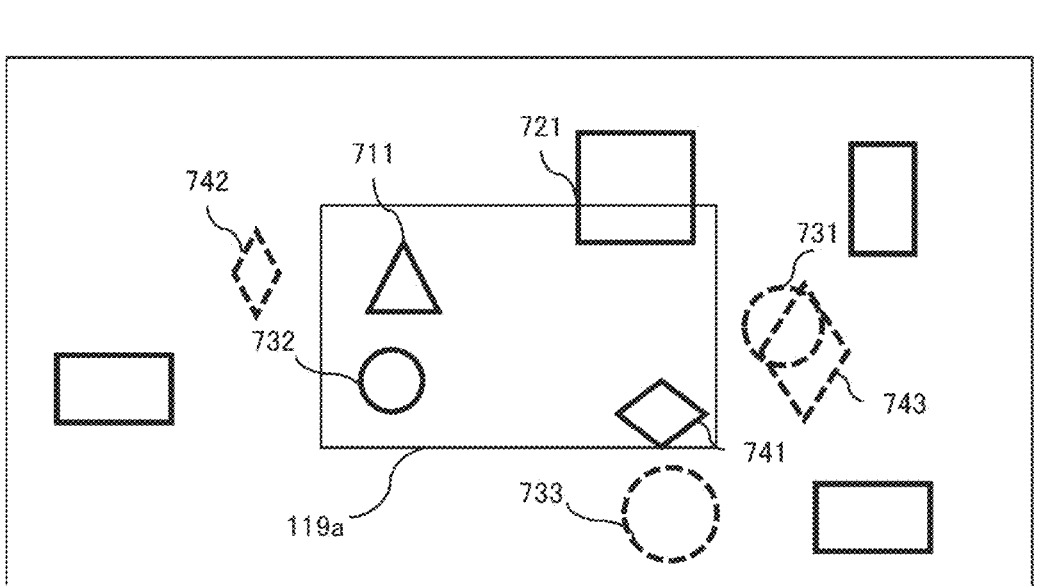
Figure 9:
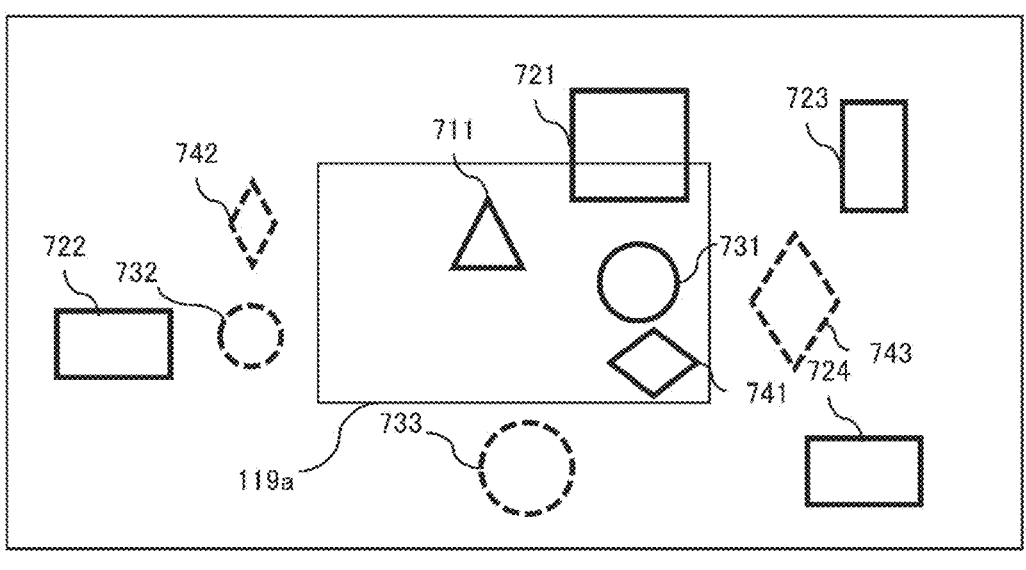
FIG. 9 explains appearances of real objects and virtual objects.
Figure 9:
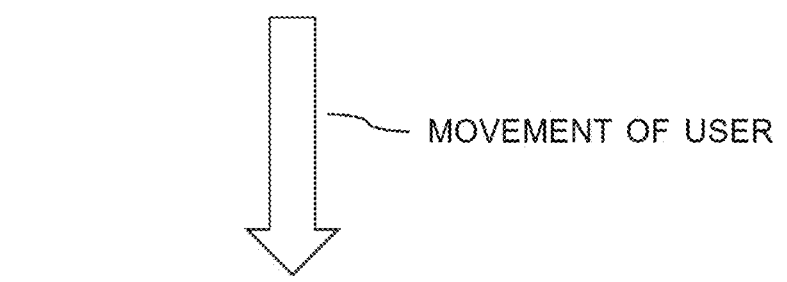
Figure 9:
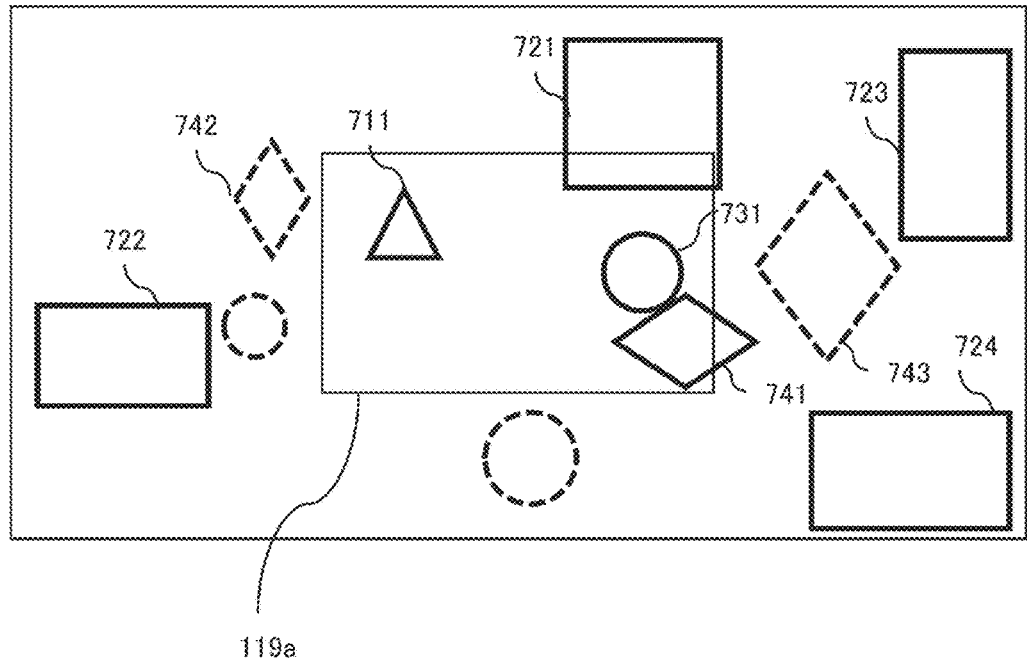

With reference to FIG. 7 to FIG. 9, appearances of real objects and virtual objects arranged in the world coordinate system, the local coordinate system, and the inertial coordinate system will be described. In FIG. 7 to FIG. 9, a rectangular mark represents a real object, and an arrangement position thereof is defined in the world coordinate system. A rhombus object is a world coordinate system virtual object of which an arrangement position is defined in the world coordinate system. A triangle mark represents a local coordinate system virtual object of which an arrangement position is defined in the local coordinate system. A circular mark represents an inertial coordinate system virtual object of which an arrangement position is defined in the inertial coordinate system. A solid line represents that an object is visible, and a dotted line represents that an object is not visible.

FIG. 7 illustrates change in appearances of objects when the user rotates only his or her head without changing his or her position in the world coordinate system. In an initial state illustrated in (the upper part of) FIG. 7, the FOV 119*a* includes a local coordinate system virtual object 711, an inertial coordinate system virtual object 731, a world coordinate system virtual object 741, and a part of the real object 721. When the user wearing the HMD 100 rotates his or her head from the initial state above, the FOV 119*a* is rotated accordingly. Since the local coordinate system virtual object 711 is rotated and moves by the same rotation amount as that of the FOV 119*a*, it is also included in the FOV 119*a* after the rotational movement and can be visually recognized. On the other hand, an inertial coordinate system virtual object 732 and a world coordinate system virtual object 742 which were located outside the FOV 119*a* become visible because they are included in the FOV 119*a* after the rotation while the inertial coordinate system virtual object 731 and the world coordinate system virtual object 741 which were located inside the FOV 119*a* become invisible.

FIG. 8 illustrates change in appearances of objects when the user performs a changing operation of the coordinate axis direction of the inertial coordinate system without changing his or her position and the orientation of his or her head in the world coordinate system. As a case requiring the changing operation of the coordinate axis direction of the inertial coordinate system, it is assumed that the user is sitting on a chair and working while facing an L-shaped work table including a front work table and a side work table juxtaposed with a side face of the front work table. In the FOV 119*a* at the time when the user is working on the front work table, it is assumed that the initial state (the upper part) of FIG. 8 is visually recognized. Here, when the coordinate axis direction of the inertial coordinate system is rotated, as illustrated in the lower part of FIG. 8, only the inertial coordinate system virtual objects 731, 732, and 733 move from left to right of FIG. 8 while the positions of the local coordinate system virtual object 711, the real object 721, and the world coordinate system virtual objects 741, 743 in the real world are unchanged.

FIG. 9 illustrates change in appearances of objects when the user moves without changing the coordinate axis direction of the inertial coordinate system and the local coordinate system. In this case, it is assumed that the initial state illustrated in (the upper part of) FIG. 9 is visually recognized. When the user moves (for example, by walking) in the world coordinate system, the real objects 721, 722, 723, 724 and the world coordinate system virtual objects 741, 742, 743 look larger as the user approaches the real objects 721, 722, 723, 724. On the other hand, the appearances of each of the local coordinate system virtual objects and the inertial coordinate system virtual objects remains the same.

Figure 10:
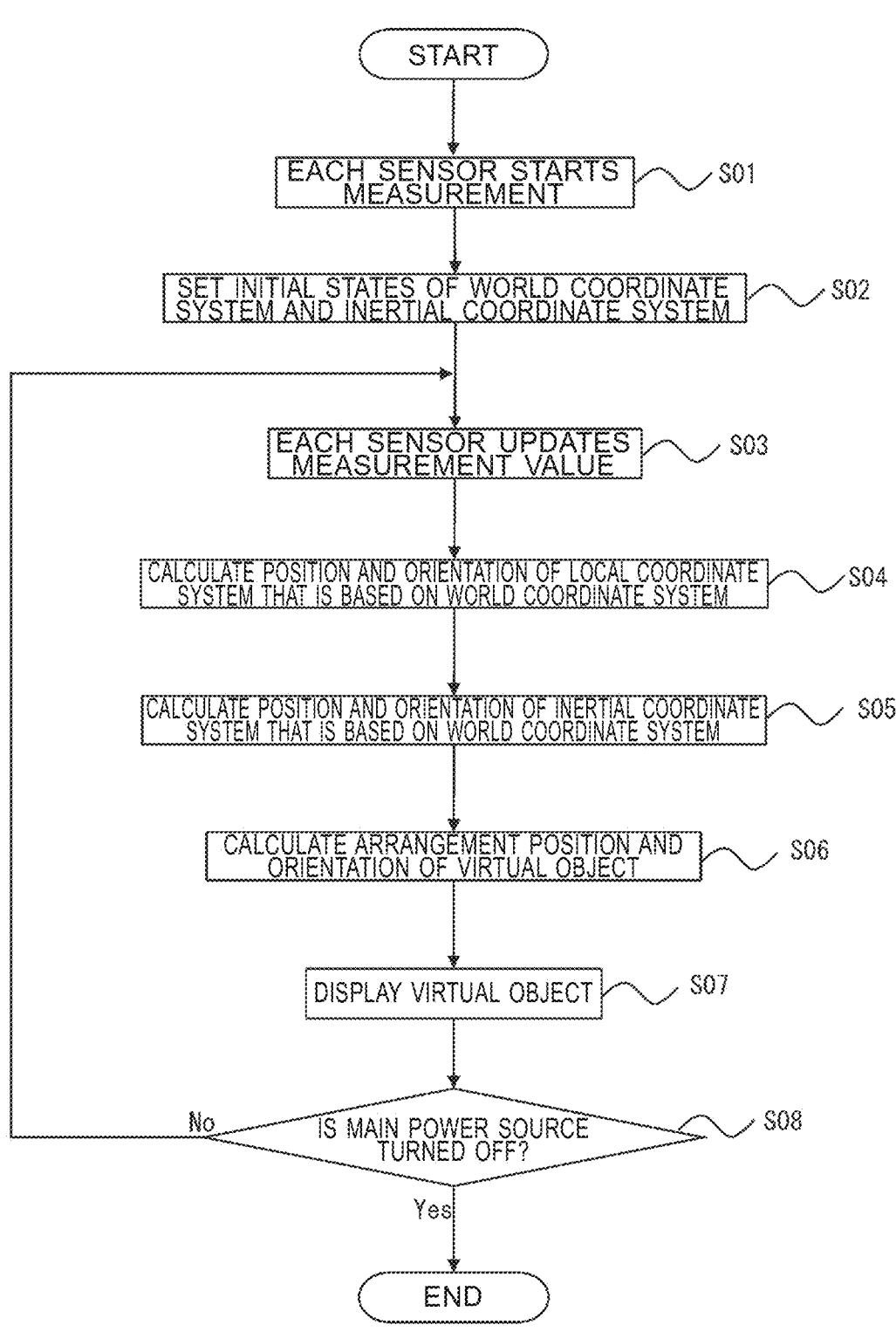
FIG. 10 illustrates a flowchart of processing in an HMD system.

With reference to FIG. 10 and FIG. 11, processing contents of the HMD system 1 will be described. FIG. 10 illustrates a flowchart of the processing in the HMD system 1. FIG. 11 illustrates an example of a data structure storing virtual objects.

When a main power source of the HMD 100 is turned on, each of the acceleration sensor 115, the gyro sensor 116, the geomagnetic sensor 117, and the GPS receiver 118 starts measurement (step S01). Each of the camera 111, the in-camera 112, and the distance sensor 113 is also started and captures images if necessary for the subsequent processing.

Next, as described above, at the time of initialization of the HMD 100, the coordinate system calculation unit 1251 detects the gravitational direction based on a signal from the acceleration sensor 115, and sets the world coordinate system based on the gravitational direction and the X-axis direction of the local coordinate system (step S02). At the time of the initialization, the origin of the inertial coordinate system is made to be matched with the origin of the local coordinate system, and the orientation of the inertial coordinate system is made to be matched with the world coordinate system. The coordinate system calculation unit 1251 causes the coordinate system information storage unit 1282 to record the position and orientation of the local coordinate system and inertial coordinate system in the initialization, which are based on the world coordinate system, and the gravitational acceleration vector in the initialization.

After the initialization, a value of the acceleration vector detected by the acceleration sensor 115, a value of the angular velocity vector detected by the gyro sensor 116, and measured values detected by the various sensors are updated (step S03).

Based on the updated acceleration vector and angular velocity vector, the coordinate system calculation unit 1251 updates the position and orientation of the local coordinate system which are based on the world coordinate system. Information from other sensors may also be used for this updating processing. The coordinate system information storage unit 1282 records the updated position and orientation information (step S04).

Based on the updated position and orientation of the local coordinate system and a change control method of the inertial coordinate system which will be described later, the coordinate system calculation unit 1251 updates the position and orientation of the inertial coordinate system which is based on the world coordinate system. Information from other sensors may also be used for this updating processing.

The coordinate system information storage unit 1282 records the updated position and orientation information (step S05).

The display control unit 1255 refers to the virtual object storage unit 1281 and reads out the type of each virtual object and which coordinate system to be used to define the arrangement position of each virtual object. The display control unit 1255 calculates the arrangement position and orientation of each virtual object in each coordinate system. Furthermore, the display control unit 1255 converts the arrangement position and orientation of each virtual object in each coordinate system to the local coordinate system of the HMD 100 (step S06).

The display control unit 1255 arranges the virtual objects. Arranging the virtual objects within the FOV 119*a* of display 119 means the same as displaying them on the display 119 (step S07).

Unless the user turns off the main power source (step S08/No), the processing returns to step S03 and signals newly output from the sensors are acquired to execute the subsequent calculation.

Hereinafter, an example of the changing operation of the inertial coordinate system in step S05 will be described.

(1) Method of Changing Inertial Coordinate System (User's Instruction)

Basically, the method of changing the direction $q_{IW}$ of the inertial coordinate system is performed in response to a user's instruction. For example, when the camera 111 recognizes the user's hand, swipe motion in the space causes the inertial coordinate system to be rotated in a swipe direction. At this time, the inertial coordinate system may be rotated about the direction axis that is perpendicular to the swipe direction in a plane perpendicular to the line-of-sight direction and passes through the origin of the inertial coordinate system. The swipe motion is converted to a rotation angular velocity vector $\omega_{SW}$, and the direction is updated by the following equation.

$$\Delta q_{IW} / \Delta t = (1/2) \omega_{SW} q_{IW} \tag{20}$$

In the equation above, $\Delta t$ represents an update interval of the local coordinate system, and the rotational angular velocity vector $\omega_{SW}$ has a finite value while the swipe motion continues. In the case without the swipe motion, the rotational angular velocity vector $\omega_{SW}$ is 0 and the orientation of the inertial coordinate system is fixed with respect to the world coordinate system. The origin of the inertial coordinate system is made to be matched with the origin of the local coordinate system. This method can directly control the orientation of the inertial coordinate system.

Furthermore, the input controller 400 may be provided with a touch panel screen which allows the user to control the orientation of the inertial coordinate system by swipe motion thereon. In this case, for example, the inertial coordinate system may be rotated about a direction axis that is perpendicular to the swipe direction in the touch panel plane and passes through the origin of the inertial coordinate system.

Still further, a control method adapted to determine the front direction of the inertial coordinate system (for example, X-axis direction), match the front direction with a reference direction on the user side (for example, the direction in which the front direction of the HMD 100 averagely faces or the front direction of the trunk), and cause the user reference direction not to follow, at least perfectly, with respect to the rotation of the user's head may be combined with the control method described above.

(2) Method of Changing Inertial Coordinate System (Control Based on User Reference Direction)

Firstly, a reference direction on the user side (user reference direction) is determined. The user reference direction may be, for example, a direction in which the front direction of the HMD 100 faces averagely. The front direction of the HMD 100 is, for example, a direction from the origin of the local coordinate system toward the center of the display surface 119*b* of the display. The unit direction vector indicating the front direction of the user is represented as $u_L$ in the local coordinate system. The unit direction vector of the front direction of the inertial coordinate system is represented as $f_I$ in the inertial coordinate system. The unit direction vector $f_I$ is, for example, one of the arrangement center directions of a virtual object. The origin of the inertial coordinate system is made to be matched with the origin of the local coordinate system. An average direction $\langle u_{LW} \rangle$ is determined by smoothing the directions of $u_L$ in the world coordinate system. The average direction $u_{LW}$ is given by the following equation.

$$u_{LW} = q_{LW} u_L q_{LW}^* \tag{21}$$

As the averaging method, for example, an exponential moving average is used although the method is not limited thereto.

$$\langle u_{LW}(t + \Delta t) \rangle = [\xi u_{LW}(t) + (1 - \xi)\langle u_{LW}(t)\rangle] \tag{22}$$

In the equation above, $\xi$ is an averaging coefficient and takes a value between 0 and 1. Although $f_I$ is made to be matched with $\langle u_{LW} \rangle$, since high visibility can be obtained when the horizontal direction of the virtual object arranged in the inertial coordinate system is maintained, the direction orthogonal to $f_I$ is maintained in the horizontal direction. In this case, the direction $q_{IW}$ of the inertial coordinate system which is based on the world coordinate system is expressed by the following equation.

$$q_{IW} = q_2 q_1 \tag{23}$$

In the equation above, $q_1$ and $q_2$ are defined by the following equations.

$$q_1 = R([P(k)f_I], [P(k)\langle u_{LW}\rangle]) \tag{24}$$

$$q_2 = R(q_1 f_I q_1^*, \langle u_{LW}\rangle) \tag{25}$$

Since the front direction of the inertial coordinate system is matched with the average front direction of the HMD 100, even if the user changes the orientation of his or her head, the orientation of the inertial coordinate system does not change immediately. The FOV 119*a* is rotated within the inertial coordinate system, so that the user can visually recognize and operate the virtual object within the inertial coordinate system in a direction range wider than a visible range in the local coordinate system. In other words, this method allows the user to use the space of the inertial coordinate system as an extended area of a displayable area in the local coordinate system.

The desirable following speed at which the front direction of the inertial coordinate system follows the front direction of the HMD 100 differs depending on use modes. For example, when a period of time during which the head direction is being changed from the average front direction of the HMD 100 is long, the slower following speed is desirable. On the other hand, for example, in the case where the direction to which the user wants to mainly direct his or her head is changed frequently, the high following speed is desirable. Accordingly, the following speed may be arbitrarily changed by the user's setting. In the averaging method described above, the following speed can be increased as the value of the averaging coefficient $\xi$ of the equation (22) is increased.

Furthermore, the direction of the inertial coordinate system is made to follow the smoothed rotation direction obtained by smoothing the rotation directions of the HMD 100 which have been calculated based on signals output from the gyro sensor 116, which is equivalent to that the smoothing process is applied to the directions of the inertial coordinate system. As a result, even when the user finely moves, it is possible to stably display the inertial coordinate system virtual object.

When there is a plurality of arrangement center directions of a virtual object, the front direction of the inertial coordinate system may be selected or switched from among them in accordance with a user's instruction. In addition, an arbitrary direction of the inertial coordinate system may be defined as the front direction by swipe motion.

The user reference direction may be determined as the front direction of the user's trunk. In order to determine the front direction of the user's trunk, an image of the user may be captured by the in-camera 112 to detect a user's trunk region based on the captured image by the outside recognition unit 1254. Here, the user's reference direction is determined within the horizontal plane of the external field to maintain the visibility of the virtual object. Firstly, the in-camera 112 detects a direction parallel to a surface of the user's chest in the local coordinate system. A unit vector directed toward the front direction of the user in the normal direction of the detected direction above is expressed as $s_L$ in the local coordinate system. A projection direction of $s_L$ onto the horizontal plane is defined as the user reference direction. An expression of the reference direction $u_{LW}$ in the world coordinate system is given by the following equation.

$$u_{LW} = [P(k) q_{LW} s_L q_{LW}^*] \tag{26}$$

The smoothing process for $u_{LW}$ is performed in order to stabilize the user reference direction, and the calculation procedures after the smoothing process are the same as those in the equations (23) to (25). In this method, since the front direction of the trunk serves as the reference direction, the user can match the front direction of the inertial coordinate system by directing his or her trunk in the direction in which he or she mainly works, thereby making it possible to naturally control the front direction of the inertial coordinate system.

While the user is moving, the traveling direction of the user may be set as the user reference direction (in this case, the smoothing process may be combined by a low-pass filter, etc.). The user reference direction expressed as $u_{LW}$ in the world coordinate system is given by the following equation.

$$u_{LW} = [P(k) v_W] \tag{27}$$

In the equation above, $v_W$ is a user's moving speed vector in the world coordinate system. The smoothing process for $u_{LW}$ is performed in order to stabilize the user reference direction, and the calculation procedures after the smoothing process are the same as those in the equations (23) to (25). The smoothed moving direction obtained by smoothing the moving directions (traveling directions) of the HMD 100 which have been calculated based on the outputs of the acceleration sensor 115 is calculated to reset the front direction of the inertial coordinate system so as to make it follow the smoothed moving direction.

As described above, according to the control method based on the user reference direction, even when the user temporarily changes the direction of his or her head, the front direction of the inertial coordinate system is maintained in a direction close to the direction to which the user's the head is averagely directed. It is convenient to employ this control method when the inertial coordinate system is used as an extended area of the displayable area in the local coordinate system.

The control method based on the user reference direction may be combined with the change control method based on a user's instruction described in (1) above. When the inertial coordinate system is rotated in accordance with the user's instruction, a direction overlapped with the user reference direction after the rotation is determined as the new front direction of the inertial coordinate system. In addition, when the direction of the body is changed suddenly, the control method based on the user instruction may be performed to immediately adjust the front direction of the inertial coordinate system to the user reference direction.

In the case where the user feels difficulty in operating a virtual object if the inertial coordinate system moves during the operation, it may be configured to allow the user to perform an input operation by using, for example, the input controller 400 to turn on/off a control mode. It may be also configured to turn off the control mode while the user is performing any operation on the virtual object.

(3) Limitation of Inertial Coordinate System

Limitation in which the $Z_I$ axis of the inertial coordinate system is to be matched to the $Z_W$ axis of the world coordinate system, in other words, the vertical direction may be provided. In this case, the swipe control by the user in the method (1) above is effective only for a component in the horizontal direction of the swipe motion.

(4) Processing at Power-Off and Power-on

At the time of power-off, the coordinate system information storage unit 1282 may store the front direction of the inertial coordinate system. In a mode where the direction of the inertial coordinate system is fixed to the world coordinate system unless the user performs the change operation, the direction to which the front direction of the HMD 100 is directed is determined as the front direction of the inertial coordinate system at the time of power-off.

As a setting of the inertial coordinate system at the time of power-on, in addition to the setting method of the initialization procedure described above, the coordinate system calculation unit 1251 may read out the previous front direction information when the power is tuned on so as to match the direction of the inertial coordinate system with the read front direction information in step S02.

(5) Method of Setting Coordinate Origin of Inertial Coordinate System

In the control method described above, the origin of the inertial coordinate system is made to be matched with the origin of the local coordinate system. Meanwhile, it may be configured to set and update the origin of the local coordinate system on a smoothed position obtained by the smoothing process so as not to follow the fine movement of the head but to follow only a certain degree of large movement. As the smoothing process, for example, an exponential moving average of the following equation is used.

$$\langle O_{HW}(t + \Delta t)\rangle = \xi O_{LW}(t) + (1 - \xi)\langle O_{HW}(t)\rangle \qquad (28)$$

In the equation above, $\xi$ is an averaging coefficient and takes a value between 0 and 1. However, in order to ensure the visibility of the virtual object arranged in the inertial coordinate system, the origin of the inertial coordinate system is controlled so as to remain within a certain range from the origin of the local coordinate system, that is, the center of the HMD 100.

(6) Page Control

It may be configured to provide a plurality of inertial coordinate systems, manage each inertial coordinate system as a page, and arrange virtual objects in each of them. FIG. 11 illustrates an example of virtual object information storing the types of virtual objects. FIG. 11 defines, in addition to the world coordinate system real object, the world coordinate system virtual object, and the local coordinate system virtual object, inertial coordinate system virtual objects displayed in a plurality of inertial coordinate systems including the inertial coordinate system 1, the inertial coordinate system 2, and the inertial coordinate system 3. Each of the "icon group for right-handed" and the "icon group for left-handed" in FIG. 11 is a group of icons. Since the "icon group for right-handed" is displayed only for a right-handed user and the "icon group for left-handed" is displayed only for a left-handed user, exclusive display control is performed therein. In accordance with the exclusive display control above, control of turning on/off a virtual object and the orientation thereof in the inertial coordinate system may be performed. It may be configured to display virtual objects to allow the user to recognize which of them is an operation target, for example, by displaying a virtual object arranged in the inertial coordinate system which is the operation target (active) in a color darker than that of a virtual object arranged in the inertial coordinate system which is not the operation target (nonactive). In addition, it may be configured to change the direction in response to the user's swipe motion for each inertial coordinate system, or change the mode of the direction control method.

Furthermore, it may be configured to display marks such as numbers (color codes) for identifying the plurality of pages defined by the inertial coordinate system 1, the inertial coordinate system 2, and the inertial coordinate system 3 which are arranged near the virtual object. It may be configured to change each of the distance between the user and each page, in other words, each of the inertial coordinate system 1, the inertial coordinate system 2, and the inertial coordinate system 3. The page that is the operation target is displayed on the front side. At this time, the size may be controlled depending on the distance so that the expected angle of the object from the user becomes constant.

(7) Display of Omnidirectional Image

A display space of the inertial coordinate system may be used to display an omnidirectional image (real object, virtual object) captured in the past. The omnidirectional image can be viewed by rotating the inertial coordinate system.

Not only the past image, but also an omnidirectional image at the current time may be displayed on the display space of the inertial coordinate system so that the user can see an image from the various directions.

(8) Omission of Local Coordinate System

It may be configured to display an important virtual object, which is used to be displayed in the local coordinate system, near a specific direction of the inertial coordinate system while not providing the local coordinate system. In this case, control for adjusting the specific direction of the inertial coordinate system to the user reference direction enables the user to access the important virtual object immediately.

(9) Automatic Arrangement of Related Object

In the case of performing processing on the world coordinate system virtual object, it may be configured to display, within the inertial coordinate system at that point, a related operation menu or the like near the world coordinate system virtual object that is a processing target. The user can access the operation menu by turning his or her head or rotating the inertial coordinate system.

(10) Application to VR Goggle and Smartphone

The present invention may be applied to a VR goggle and a smartphone. In the case of a VR goggle, an image of the external field is arranged in the world coordinate system as a video see-through image. In the case of a smartphone, a position of the user is measured and the measured position is set as the origin of the inertial coordinate system. Since the distance between the smartphone and a virtual object fixed to the inertial coordinate system changes, the display size of the virtual object may be changed in accordance with the change in the distance (zooming up when the smartphone approaches the arrangement position of the virtual object).

According to the embodiment above, it is possible to arrange a virtual object by using an inertial coordinate system as a new coordinate system for complementing defects in the world coordinate system and the local coordinate system. Conventionally, the local coordinate system has had a problem that, since the virtual object is arranged only in the FOV fixed to the coordinate system in its visible state, the number of virtual objects to be arranged thereon is limited and the visibility is reduced. The present invention is configured to define the arrangement position of the virtual object by using the inertial coordinate system, so that the virtual object can be arranged outside the FOV in the local coordinate system. As a result, the user can visually recognize the virtual object by moving his or her head when necessary, thereby making it possible to solve the problem of the limitation in the number of the virtual objects to be arranged thereon without reducing the visibility.

There has been another problem that, in the case where the virtual object is arranged in the world coordinate system, the virtual object is hardly viewed as the user moves. The present invention is configured to define the arrangement position of the virtual object by using the inertial coordinate system so that the virtual object can be moved in accordance with the movement of the user. As a result, the defects in the world coordinate system can be complemented.

The present invention is not limited to the embodiment described above, and various modifications are included therein. For example, the embodiment described above has been explained in detail in order to clarify the present invention, but is not necessarily limited to those having all the configurations described. In addition, a part of the configuration of the present embodiment can be replaced with that of another embodiment, and the configuration of another embodiment can be added to the configuration of the present embodiment. Furthermore, it is possible to add, delete, or replace another configuration with respect to a part of the configuration of the present embodiment.

Some or all the above-mentioned configurations may be configured by hardware, or the functions may be implemented by execution of programs by the processor. The control lines and the information lines which are considered to be necessary for the purpose of explanation are indicated herein, and not all the control lines and the information lines of actual products are necessarily indicated. Practically, almost all the configurations are connected to each other.

For example, in the embodiment above, the virtual object is displayed on the HMD 100 by using three coordinate systems, namely, the world coordinate system, the local coordinate system, and the inertial coordinate system. Meanwhile, it may be configured to display the virtual object by only using the inertial coordinate system. Furthermore, it may be configured to display the virtual object by combining the inertial coordinate system with at least one of the world coordinate system and the local coordinate system.

REFERENCE SIGNS LIST

1: HMD system
100: HMD
111: camera
112: in-camera
113: distance sensor
115: acceleration sensor
116: gyro sensor
117: geomagnetic sensor
118: GPS receiver
119: display
119*a*: effective field of view
120: network communication transmitter-receiver
123: antenna
125: CPU
126: program
127: information data
128: memory
129: near field communication transmitter-receiver
130: image
131: virtual object
140: bus
200: server
300: external network
400: input controller
410: virtual object
420: virtual object
510: virtual object
520: virtual object
1200: display control device

The invention claimed is:

1. A virtual object display device, comprising:
a display;
a motion measurement sensor configured to measure a movement and a rotation of the virtual object display device in a real world;
a communication interface configured to communicate with an input controller that receives an instruction from a user of the virtual object display device;

a processor configured to:
detect the movement and the rotation of the virtual object display device in the real world using the motion measurement sensor;
use an inertial coordinate system in which a coordinate origin thereof follows movement of the virtual object display device and an effective field of view of the display is rotated therein in accordance with rotation of the virtual object display device so as to define an arrangement position of an inertial coordinate system virtual object;
in response to determining that the inertial coordinate system virtual object is included in the effective field of view of the display, display the inertial coordinate system virtual object within the effective field of view; and
in response to receiving an instruction related to a front direction from the input controller through the communication interface, reset a front direction of the inertial coordinate system to a user reference direction which is a front direction of the virtual object display device in the real world.

2. The virtual object display device according to claim 1, wherein the motion measurement sensor includes an acceleration sensor and a gyro sensor.

3. The virtual object display device according to claim 1, wherein the motion measurement sensor includes a camera.

4. The virtual object display device according to claim 1, wherein the processor is a CPU.

5. The virtual object display device according to claim 1, wherein the virtual object display device is a head mounted display.

6. The virtual object display device according to claim 1, wherein the communication interface includes a near field communication transmitter-receiver.

7. The virtual object display device according to claim 1, wherein the input controller includes a keyboard or key buttons.

8. The virtual object display device according to claim 1, wherein the processor is configured to define an arrangement position of a world coordinate system virtual object using a world coordinate system fixed to a real world when the world coordinate system virtual object is included in the effective field of view of the display.

9. The virtual object display device according to claim 1, wherein the processor is configured to define an arrangement position of a local coordinate system virtual object using a local coordinate system fixed to the virtual object display device when the local coordinate system virtual object is included in the effective field of view of the display.

10. The virtual object display device according to claim 1, further comprising a memory configured to store at least one group including a plurality of inertial coordinate system virtual objects and arrangement center direction information for defining arrangement positions of the plurality of inertial coordinate system virtual objects included in the group.

11. The virtual object display device according to claim 10, wherein the memory is configured to store operation group information for right-handed and operation group information for left-handed.

12. A head mounted display system, comprising:
a head mounted display comprising a display, a motion measurement sensor, a communication interface, and a processor; and
an input controller configured to receive an instruction from a user and communicate with the head mounted display, wherein the processor is configured to:

detect a movement and a rotation of the head mounted display in a real world using the motion measurement sensor;

use an inertial coordinate system in which a coordinate origin thereof follows the movement of the head mounted display and an effective field of view of the display is rotated therein in accordance with the rotation of the head mounted display so as to define an arrangement position of an inertial coordinate system virtual object;

in response to determining that the inertial coordinate system virtual object is included in the effective field of view of the display, display the inertial coordinate system virtual object within the effective field of view; and in response to receiving an instruction related to a front direction from the input controller through the communication interface, reset a front direction of the inertial coordinate system to a user reference direction which is a front direction of the head mounted display in the real world.

13. The head mounted display system according to claim 12, wherein the motion measurement sensor includes an acceleration sensor and a gyro sensor.

14. The head mounted display system according to claim 12, wherein the motion measurement sensor includes a camera.

15. The head mounted display system according to claim 12, wherein the communication interface includes a near field communication transmitter-receiver.

16. The head mounted display system according to claim 12, wherein the input controller includes a keyboard or key buttons.

17. The head mounted display system according to claim 12, wherein the processor is configured to define an arrangement position of a world coordinate system virtual object using a world coordinate system fixed to a real world when the world coordinate system virtual object is included in the effective field of view of the display.

18. The head mounted display system according to claim 12, wherein the processor is configured to define an arrangement position of a local coordinate system virtual object using a local coordinate system fixed to the head mounted display when the local coordinate system virtual object is included in the effective field of view of the display.

19. The head mounted display system according to claim 12, wherein the head mounted display further comprises a memory configured to store at least one group including a plurality of inertial coordinate system virtual objects and arrangement center direction information for defining arrangement positions of the plurality of inertial coordinate system virtual objects included in the group.

20. The head mounted display system according to claim 19, wherein the memory is configured to store operation group information for right-handed and operation group information for left-handed.

* * * * *